(12) United States Patent
Ozog et al.

(10) Patent No.: US 11,536,354 B2
(45) Date of Patent: Dec. 27, 2022

(54) POWER TAILGATE ACTUATOR ASSEMBLY INCLUDING BELLOWS

(71) Applicant: Aisin Technical Center of America, Inc., Northville, MI (US)

(72) Inventors: Nicholas Ozog, South Lyon, MI (US); Ryan Heins, Wixom, MI (US); Takashi Nishio, Novi, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 9 days.

(21) Appl. No.: 17/217,508

(22) Filed: Mar. 30, 2021

(65) Prior Publication Data
US 2022/0316564 A1 Oct. 6, 2022

(51) Int. Cl.
*F16H 25/20* (2006.01)
*F16J 3/04* (2006.01)
*B62D 33/027* (2006.01)
*E05F 15/622* (2015.01)
*F16J 15/56* (2006.01)

(52) U.S. Cl.
CPC ............. *F16H 25/20* (2013.01); *F16J 3/046* (2013.01); *B62D 33/0273* (2013.01); *E05F 15/622* (2015.01); *E05Y 2201/702* (2013.01); *E05Y 2900/544* (2013.01); *F16H 2025/2031* (2013.01); *F16J 15/56* (2013.01)

(58) Field of Classification Search
CPC ... F16H 25/20; F16H 2025/2031; F16J 15/56; E05Y 2900/544; E05Y 2201/702; B62D 33/0273
See application file for complete search history.

(56) References Cited

U.S. PATENT DOCUMENTS 4,629,641 A * 12/1986 Paullin ..................... F16J 3/042
428/184
4,844,486 A * 7/1989 Schiemann ............. F16D 3/845
464/175
(Continued)

FOREIGN PATENT DOCUMENTS

DE 202007002306 U1 6/2008
DE 202014102033 U1 7/2015

OTHER PUBLICATIONS

U.S. Appl. No. 16/883,246, titled "Hinge Assembly for a Power Tailgate System", filed May 26, 2020.

*Primary Examiner* — David M Fenstermacher
(74) *Attorney, Agent, or Firm* — Christopher G. Darrow; Darrow Mustafa PC

(57) ABSTRACT

Embodiments of an actuator assembly for a power tailgate system are disclosed. The actuator assembly includes an actuator having a housing, a guide with a first end extending from the housing and a second end opposite the first end, and a slide coupled to the guide so as to be movable with respect to the guide second end. The actuator assembly also includes a bellows having a first end attached to the guide first end, a second end opposite the first end and attached to an end of the slide, and a body extending between the first and second ends. At least one hole is formed in the bellows proximate the bellows second end and enables fluid communication between an interior of the bellows and an exterior of the bellows. The bellows may expel moisture collected therein during operation of the actuator.

17 Claims, 5 Drawing Sheets

(56) References Cited

U.S. PATENT DOCUMENTS

| | | | |
|---|---|---|---|
| 6,106,424 A * | 8/2000 | Kratz | F16H 7/0836 474/138 |
| 6,974,387 B1 * | 12/2005 | Houis | F16J 3/046 285/132.1 |
| 7,823,709 B2 | 11/2010 | Beck | |
| 9,103,154 B2 | 8/2015 | Sitzler et al. | |
| 2014/0174075 A1 * | 6/2014 | Garcia Alcaraz | F16J 3/043 60/602 |
| 2016/0223030 A1 * | 8/2016 | Dunning | B60C 23/00336 |
| 2018/0119748 A1 * | 5/2018 | Cassell | F16D 3/2245 |
| 2018/0119817 A1 * | 5/2018 | Landberg | F15B 15/149 |
| 2019/0092378 A1 * | 3/2019 | Klank | B62D 5/0445 |
| 2019/0107198 A1 * | 4/2019 | Golden | F15B 15/1461 |

* cited by examiner

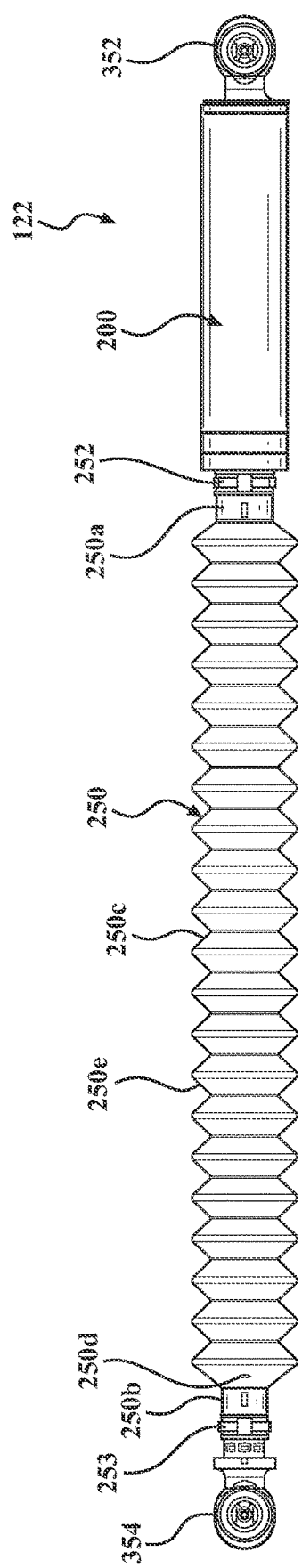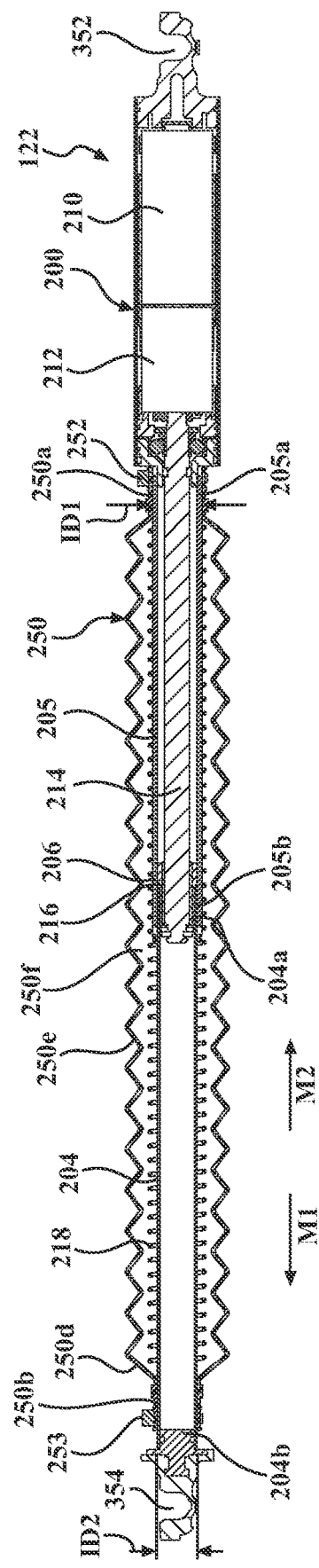
FIG. 2A
FIG. 2B

POWER TAILGATE ACTUATOR ASSEMBLY INCLUDING BELLOWS

TECHNICAL FIELD

The embodiments disclosed herein relate to actuator assemblies for power tailgate systems and, more particularly, to an actuator assembly including a motor-driven spindle drive and a bellows designed to cover portions of the spindle drive during operation of a vehicle.

BACKGROUND

Many vehicles include tailgates. The tailgates serve as closure panels, and are movable between closed positions and open positions. Many of today's vehicles with tailgates also include power tailgate systems. The power tailgate systems include motor-driven tailgate actuators for automatically opening and closing the tailgates.

In certain vehicle designs, it has been found that contaminants such as dirt, dust, and moisture may migrate into the vehicle body through interstitial pathways existing between components of the body. For example, the tailgate actuator may be located behind the vehicle tail lamp and may not be visible from the rear or side of the vehicle. However, the lowest portion of the actuator may not be covered by the tail lamp and may be positioned behind the fender where it is directly exposed to the external environment of the vehicle. Also, there may be openings in the vehicle body near the top of the actuator where water and dust may enter. In addition, under certain vehicle end-use conditions, a portion of the actuator may be submerged in water. Thus, while the portions of the actuator containing the motor, gears, and electronics may be sealed to protect these components, moisture and other contaminants may come into contact with other elements of the actuator, possibly causing corrosion and other damage and otherwise interfering with operation of the actuator.

SUMMARY

In one aspect of the embodiments described herein, an actuator assembly is provided. The actuator assembly includes an actuator having a housing, a guide with a first end extending from the housing and a second end opposite the first end, and a slide coupled to the guide so as to be movable with respect to the guide second end. The actuator assembly also includes a bellows having a first end attached to the guide first end, a second end opposite the first end and attached to an end of the slide, and a body extending between the first and second ends. At least one hole is formed in the bellows proximate the bellows second end and enables fluid communication between an interior of the bellows and an exterior of the bellows.

In another aspect of the embodiments described herein, a bellows is provided. The bellows is structured to cover at least a portion of a motor-driven spindle drive. The bellows includes a first end, a second end opposite the first end, and a body extending between the first and second ends. At least one hole is formed in the bellows proximate the bellows second end and enables fluid communication between an interior of the bellows and an exterior of the bellows.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2A is a schematic side view of an actuator assembly including an actuator and a bellows covering the actuator, as shown in FIG. 1B.

FIG. 2B portrays the tailgate actuator using a schematic cross-sectional view taken along the line 2B-2B in FIG. 1B, showing the motor included as part of the tailgate actuator in an implementation in which the tailgate actuator is a motor-driven spindle drive and showing a bellows covering portions of the actuator.

DETAILED DESCRIPTION

This disclosure relates to an actuator assembly for a power tailgate system. The actuator assembly includes an actuator having a housing, a guide with a first end extending from the housing and a second end opposite the first end, and a slide coupled to the guide so as to be movable with respect to the guide second end. The actuator assembly also includes a bellows having a first end attached to the guide first end, a second end opposite the first end and attached to an end of the slide, and a body extending between the first and second ends. At least one hole is formed in the bellows proximate the bellows second end and enables fluid communication between an interior of the bellows and an exterior of the bellows. The bellows may expel moisture collected therein during operation of the actuator. Attachment of the bellows to the actuator protects portions of the actuator from moisture and dirt, and also allows any moisture accumulating in the bellows interior to be drained when the bellows is compressed or retracted.

Figure 1A:
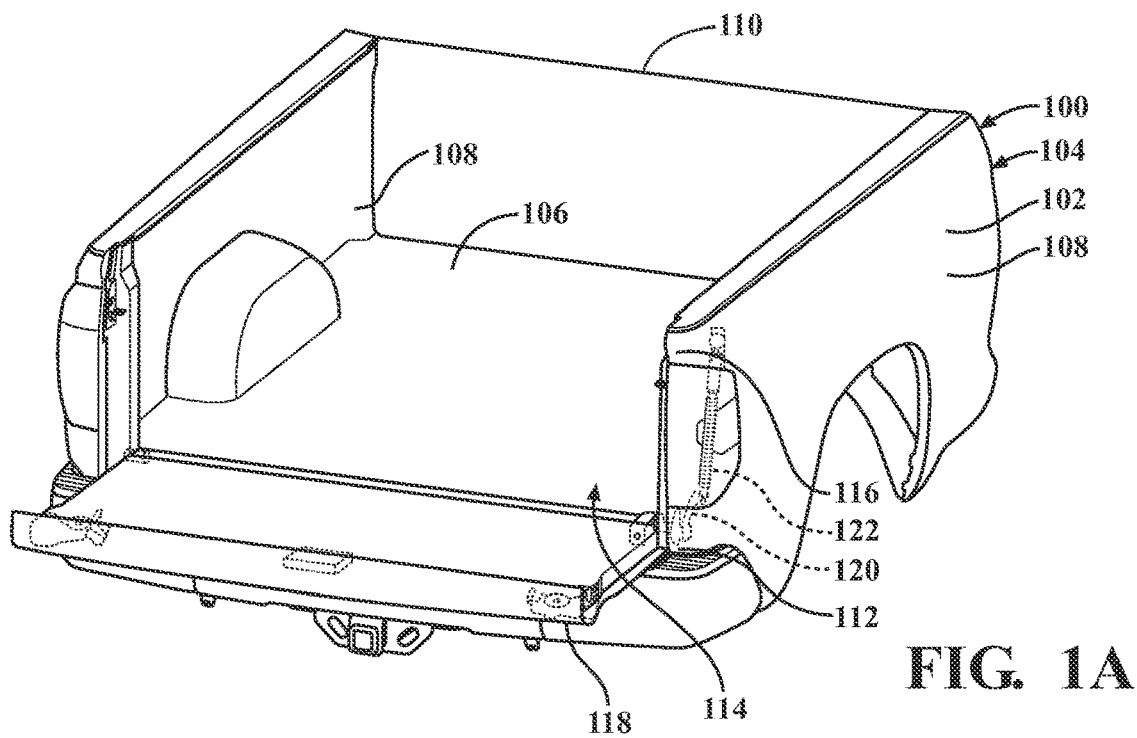
FIG. 1A is a rear perspective view of a vehicle including a truck bed having a tailgate shown in an open position, and incorporating an actuator assembly including a bellows in accordance with an embodiment described herein.

FIG. 1A shows part of a representative passenger vehicle 100 incorporating an actuator assembly including an actuator 122 and a bellows 250 in accordance with an embodiment described herein. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 104 that forms the exterior and defines or otherwise encloses the bed 102 and the other compartments. In relation to the bed 102, the body 104 includes a deck 106, two sides 108, a bulkhead 110 and a rear end 112. At the rear end 112, the body 104 defines a tailgate opening 114. Likewise, the body 104, including but limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114.

Figure 1B:
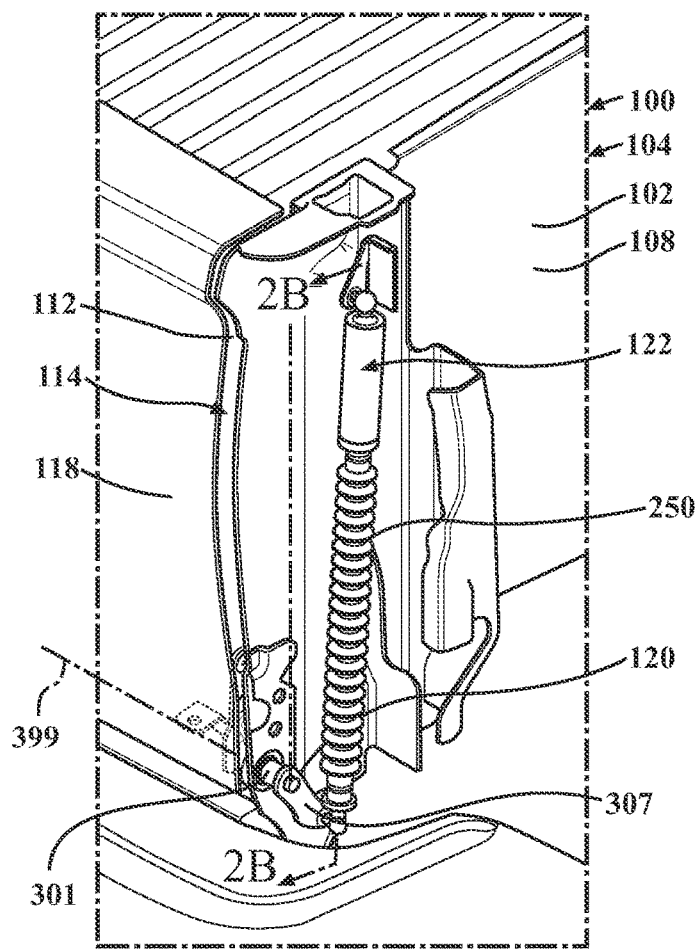
FIG. 1B is a perspective view of a portion of the vehicle of FIG. 1A, showing an actuator, crank, and rotatable element of the power tailgate system mounted in the vehicle.

As shown with additional reference to FIG. 1B, the tailgate 118 serves as closure panel for the bed 102. The tailgate 118 is pivotally connected to the surrounding body 116 for movement, relative to the tailgate opening 114, between a closed (or "up") position and an open (or "down") position through a range of partially-open positions. In FIG. 1B, the tailgate 118 is shown in the closed position. In the closed position, the tailgate 118 is positioned over the tailgate opening 114, with the periphery of the tailgate 118 adjacent to the surrounding body 116, and the tailgate 118 in alignment with the surrounding body 116. In FIG. 1A, the tailgate 118 is shown in the open position. In the open position, the tailgate 118 is positioned away from the tailgate opening 114, which allows access to the bed 102 from the rear of the vehicle 100.

As shown with particular reference to FIG. 1B, in relation to opening the tailgate 118 and closing the tailgate 118, the vehicle 100 includes a hinge assembly 120, and an in-bed tailgate actuator 122. Serving, at least in part, as a basic hinge, the hinge assembly 120 runs between the bed 102 and the tailgate 118. The hinge assembly 120 connects the tailgate 118 to the bed 102, and supports the tailgate 118 from the bed 102 for rotational movement between the closed position and the open position. The tailgate actuator 122 corresponds to the hinge assembly 120, and may be housed, in whole or in part, in the bed 102. From inside the bed 102, the tailgate actuator 122 is connected with the tailgate 118 through the hinge assembly 120. Although the vehicle 100, as shown, includes one hinge assembly 120, and one tailgate actuator 122, it will be understood that this disclosure is applicable in principle to otherwise similar vehicles 100 including one or more hinge assemblies 120, and one or more tailgate actuators 122.

Referring to FIG. 1B, in one or more arrangements, the hinge assembly 120 may include a rotatable element 301 structured for transmitting rotational force to the tailgate. In one or more arrangements, the rotatable element may be rotary through-bed torque shaft incorporated into the hinge assembly 120 for operable connection with the tailgate. In other arrangements, the rotatable element may be another rotatable portion of the hinge assembly structured for operable connection with the tailgate, depending on the particular hinge assembly design. The rotatable element 301 may be axially aligned with the pivotal movement of the tailgate 118, and supported from the bed 102 for axial rotation. The rotatable element 301 may support the tailgate 118 for rotation about an associated rotatable element rotational axis 399. Moreover, the hinge assembly 120 may also include a pivotal in-bed crank 307 operably connected to the rotatable element 301 along the rotational axis 399 of the rotatable element 301 so that a rotation of the crank 307 produces a corresponding rotation of the rotatable element 301 about the axis 399 (i.e., rotating the crank 307 45° about the rotatable element rotational axis 399 produces a corresponding rotation of the rotatable element 301 45° about the axis). From outside the bed 102, the rotatable element 301 may be connected to and support the tailgate 118 from the bed 102. From inside the bed 102, the tailgate actuator 122 is connected between the bed 102 and the crank 307. Moreover, the bed 102, the tailgate actuator 122 and the crank 307 serially share pivotal connections. The rotatable element 301 may transmit torque and rotation associated with the pivotal movement of the tailgate 118 between the tailgate and the crank 307. In this manner, the actuator motor 210 (FIG. 2B) motor may be operably connected with the rotatable element for interdependent movement. Specifically, the motor 210 may be operably connected with the rotatable element 301 for producing a rotation of the rotatable element in the manner described herein. The term "operably connected," as used throughout this description, can include direct or indirect connections, including connections without direct physical contact. A tailgate may be considered to be operably connected with the rotatable element 301 when the rotation of the rotatable element produces a corresponding rotation of the tailgate, as described above.

With the bed 102, the tailgate actuator 122 and the crank 307 serially sharing pivotal connections, from between the bed 102 and the crank 307, as the product of extending and retracting as described herein, the tailgate actuator 122 is operable to pivot the crank 307 against the bed 102. With the tailgate 118, the rotatable element 301 and the crank 307 serially sharing rotary connections, as the crank 307 pivots, the rotatable element 301 axially rotates, and, as the rotatable element 301 axially rotates, the tailgate 118 pivotally closes, pivotally opens, and otherwise pivotally moves between the open position and the closed position. The actuator 122 may be operable to open and close the tailgate responsive to control commands generated by a human user and/or responsive to autonomously generated control commands in reaction to a specific control logic or a predetermined set of conditions.

As shown with particular reference to FIGS. 2A and 2B, in one implementation, the tailgate actuator 122 may be a motor-driven spindle drive. The tailgate actuator 122 may include a housing 200. Actuator 122 may also include a tubular guide 205 having a first end 205a extending from the housing 200 and a second end 205b formed opposite the first end. Actuator 122 may also include a slide 204 coupled to the guide 205 so as to be movable with respect to the guide second end 205b. The slide may have a first end 204a received in the guide 205 and a second end 204b opposite the first end. The slide 204 may be operably connected to the guide 205 so as to be movable in a first direction M1 away from the housing 200 to extend the actuator 122 and in a second direction M2 opposite the first direction and toward the housing 200 to retract the actuator. In particular arrangements, the slide first end 204a may be coaxially received in the guide second end 205b along an overlap portion 206 extending therebetween, and the slide 204 may be structured to be extendible from and retractable into the guide 205.

Referring to FIGS. 1A-2B, inside the housing 200, the guide 205, and the slide 204, the tailgate actuator 122 may include axially aligned items for converting rotary movement into linear extension and retraction of the slide. In particular, the tailgate actuator 122 may include a fixed motor 210 and a fixed reduction drive 212 mounted in the housing 200. A rotary power screw 214 may be operably coupled to the reduction drive 212. The motor 210 and the reduction drive 212 may be secured within the housing 200. A fixed nut 216 may be secured with the slide 204, and the power screw 214 may run through the nut 216. The housing 200 and the nut 216 may support the power screw 214 for axial rotation, including powered axial rotation by the motor 210 through the reduction drive 212. In one implementation, the reduction drive 212 may be a planetary reduction drive. For instance, the reduction drive 212 may be a multistage planetary reduction drive. In one implementation, the power screw 214 may be a ball screw, and the nut 216 may be a ball nut. A spring 218 (such as a continuous coil spring, for example) may be wrapped around the exterior of the guide 205 and the exterior of the slide 204.

The motor 210 may be operable to drive the tailgate actuator 122 to extend and retract. In particular, the motor 210 may be operable to spin, and thereby power the axial rotation of the power screw 214 through the reduction drive 212. As the power screw 214 axially rotates, the nut 216 axially moves along the power screw 214, and, as the nut 216 axially moves along the power screw 214, the housing 200 and the slide 204 are alternately drawn apart and drawn together. As the housing 200 and the slide 204 are drawn apart, the tailgate actuator 122 is extended. Alternately, as the housing 200 and the slide 204 are drawn together, the tailgate actuator 122 is retracted.

From inside the bed 102, the tailgate actuator 122 is configured to reach between the bed 102 and the crank 307. As the product of extending and retracting, the tailgate actuator 122 is operable to pivot the crank 307 against the bed 102. Likewise, to allow the tailgate actuator 122 to extend and retract in association with pivoting the crank 307 against the bed 102, the bed 102, the tailgate actuator 122 and the crank 307 serially share pivotal connections. Accordingly, the bed 102 and the tailgate actuator 122 are configured to make a pivotal connection with one another. In particular, the bed 102 includes a bracket-mounted ball stud (not shown), the tailgate actuator 122 includes a ball socket 352, and the bed ball stud and the ball socket 352 are configured to make a ball-and-socket connection with one another. Moreover, the crank 307 and the tailgate actuator 122 are configured to make a pivotal connection with one another. In particular, the crank 307 includes a ball stud (not shown), the tailgate actuator 122 includes a ball socket 354, and the crank ball stud and the ball socket 354 are configured to make a ball-and-socket connection with one another. These connections accommodate extension and retraction of the slide 204 with respect to the guide as the actuator 122 raises and lowers the tailgate.

In one or more arrangements, the actuator 122 may be structured as described in commonly-owned pending U.S. patent application Ser. No. 16/883,246, the disclosure of which is incorporated by reference herein in its entirety.

In certain vehicle designs, it has been found that contaminants such as dirt, dust, and moisture may migrate into the vehicle body 104 through interstitial pathways existing between components of the body 104. For example, the actuator 122 may be located behind the vehicle tail lamp and may not be not visible from the rear or side of the vehicle. However, the lowest portion of the actuator 122 is not covered by the tail lamp and may be positioned behind the fender where it is directly exposed to the vehicle exterior. Therefore, the lowest part of the actuator 122 can be seen from the bottom of the vehicle. Also, there may be openings in the vehicle body 104 near the top of the actuator where water and dust may enter. In addition, under certain vehicle end-use conditions, a portion of the actuator 122 may be submerged in water. While the housing 200 may be sealed to protect the motor 210 and reduction gears 212, moisture and other contaminants may come into contact with other elements of the actuator (such as the spring 218), possibly causing corrosion and other damage and otherwise interfering with operation of the actuator.

To help protect exposed and vulnerable portions of the actuator 122 from dust, moisture, and other contaminants, a bellows 250 may be mounted on the actuator. The bellows 250 may be specially adapted to cover portions of a motor-operated spindle drive (such as actuator 122) as described herein during operation of the drive.

Referring to FIGS. 2A and 2B, in one or more arrangements, the bellows 250 may have a first end 250a attached to the guide first end 205a at or near where the guide first end 205a extends from the housing 200. The bellows 250 may also have a second end 250b opposite the first end and attached to an end 204b of the slide 204 which is operably coupled to the ball socket 354. A bellows body 250c extends between the first and second ends 250a, 250b. The body 250c may include a series of similar, regularly-spaced, connected corrugated sections 250e and may be structured to be axially extendible and contractible in a known manner to accommodate extension and retraction of the tailgate actuator 122 as described herein. As seen in FIG. 1B, the actuator/bellows assembly may angle downwardly in a direction from the bellows first end 250a toward the bellows second end 250b when the actuator assembly is installed in a vehicle.

Referring again to FIGS. 2A, and 2B, the bellows first end 250a, second end 250b, and body 250c may define an interior 250f of the bellows 250. The bellows 250 may be structured so that, when attached to the actuator 122, the overlap portion 206, at least a portion of the guide 205, and at least a portion of the slide 204 are all enclosed within the bellows interior 250f. In an actuator embodiment including a spring 218 as shown in FIGS. 2A, 2B, the bellows 250 may be structured to also enclose the spring when the bellows is mounted to the actuator 122. As used herein, the term "enclose" is understood to mean that the portions of actuator 122 residing within the bellows interior 250f are surrounded on all sides by the bellows 250 (except where holes are formed in the bellows for air intake and/or drainage as described herein). This coverage enables the bellows 250 to provide maximum protection against contaminant exposure to the enclose portions of the actuator 122. Ends 250a, 250b of the bellows 250 may be attached to associated portions of the actuator 122 using hose clamps, tie wraps and/or other suitable mechanisms. This makes it relatively easy to attach the bellows 250 to (and detach the bellows from) the actuator 122.

Referring to FIGS. 2A and 2B, for situations (such as a defective or damaged attachment of the bellows to the actuator, or where the bellows itself becomes cracked or holed), at least one through hole 250d may be formed proximate the bellows second end 250b to enable fluid communication between the interior 250f of the bellows 250 and an exterior of the bellows. The hole(s) 250d may be structured and positioned to facilitate drainage of moisture from the bellows interior. In one or more arrangements, the hole(s) 250d may be formed in a portion of a corrugated section of the bellows structured to face generally downwardly when the bellows is attached to an actuator mounted on a vehicle as shown in FIG. 1B for raising and lowering the tailgate 118. During operation of the actuator, as the bellows 250 is contracted, air inside the bellows interior 250f may become compressed, which tends to force liquid moisture residing in the bellows interior 250f close to the hole(s) 250d through the hole(s) to the bellows exterior.

In one or more arrangements, the bellows first end 250a may have a first internal diameter ID1 structured to receive the portion of the guide 205 extending from the housing 200 in a close sliding fit. The bellows second end 250b may have a second internal diameter ID2 structured to receive the second end 204b of the slide 204 in a close sliding fit. As the outer diameters of the guide 205 and slide 204 may be different at the locations at which they are attached to the bellows 250, in some arrangements the second internal ID2 diameter may be different from the first internal diameter ID1.

It is desirable for moisture entering the bellows interior 250f to adhere to the interior surfaces of the bellows 250 when flowing downward toward slide second end 204b so that contact between the moisture and spring 218 and other actuator components is prevented. If desired, the adhesion of water to the bellows interior surfaces may be enhanced by appropriate selection of bellows materials and/or material surface finishes. For example, adhesion of water to the bellows surfaces may be promoted by forming the bellows from an amorphous material having a relatively high surface energy. In these cases, a material which also accommodates the operational mechanical deformations of the bellows is also desirable. Examples of suitable materials may include EPDM rubber, thermoplastic elastomer mixes of rubber and plastic, thermoplastic olefin polymer/filler blends, thermoplastic styrene polymer/filler blends, vinyl chloride resins, and any other suitable material.

Figure 3A:
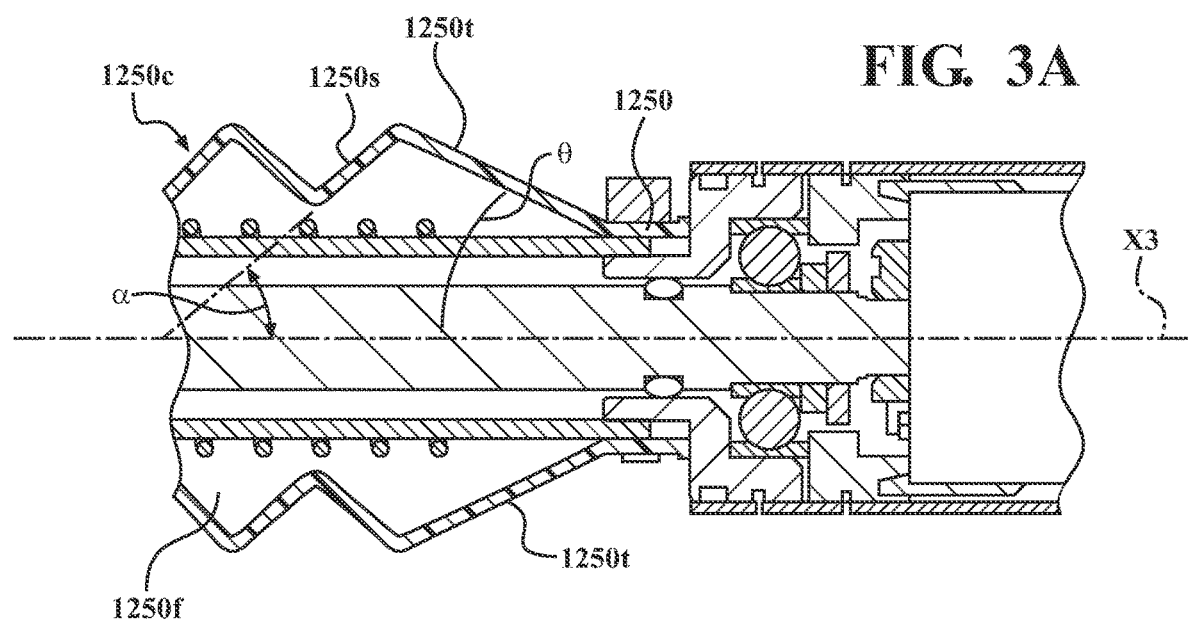
FIG. 3A is a schematic cross-sectional side view of a first end of an alternative embodiment of the bellows.
Figure 3B:
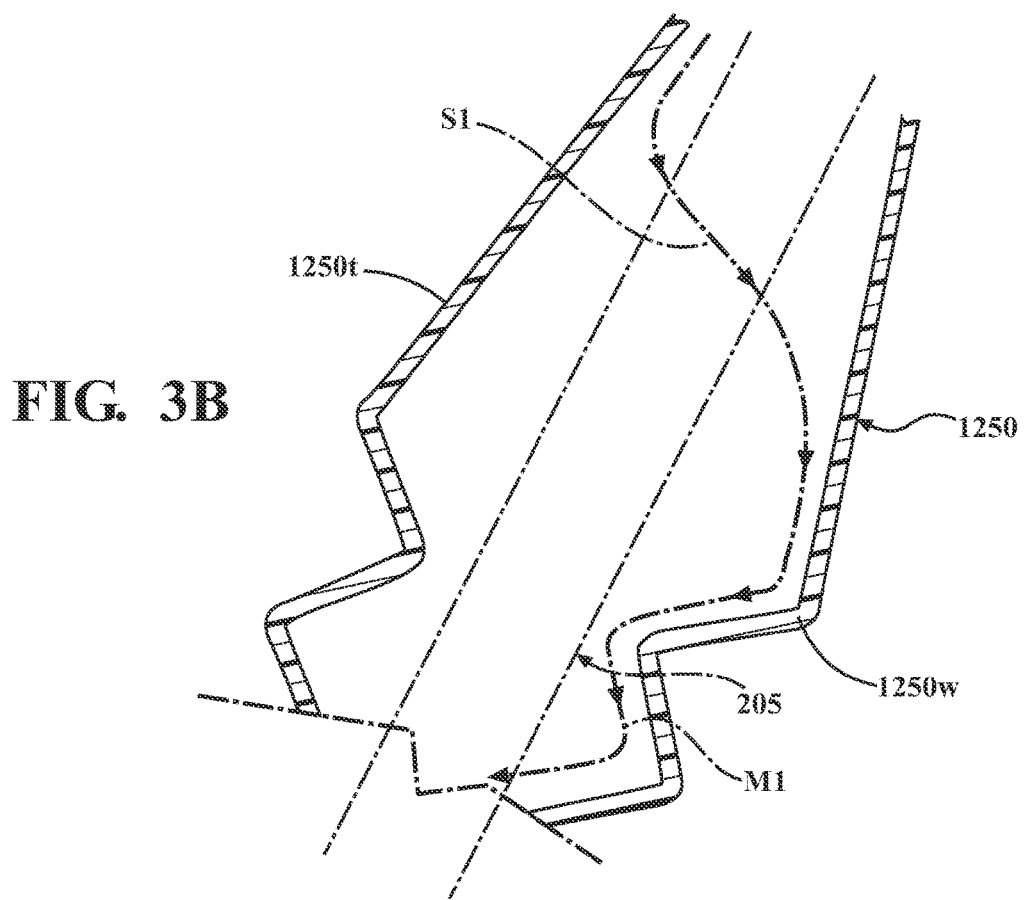
FIG. 3B is a schematic cross-sectional side view of the end of the bellows shown in FIG. 3A, shown in an orientation where the actuator to which the bellows is attached is mounted on a vehicle as shown in FIGS. 1A-1B.

FIG. 3A is a cross-sectional side view of a first end 1250a of another embodiment 1250 of the bellows. FIG. 3B is a cross-sectional side view of the end 1250a of the bellows 1250 in an orientation where the actuator to which the bellows is attached is mounted on a vehicle as shown in FIGS. 1A-1B. Referring to FIGS. 3A-3B, if the bellows attachment mechanism at the bellows first end 1250a becomes damaged or if the first end of the bellows becomes cracked or otherwise damaged, an entry point for moisture and other contaminants may be formed near the bellows first end 1250a.

FIGS. 3A-3B show a particular embodiment in which a transition section 1250t has been formed in the bellows body 1250c and connected to the bellows first end 1250a. FIG. 3A shows the first end 1250a of the bellows 1250 when the bellows is in a stretched or extended condition. It has been found that provision of a transition section 1250t connecting the bellows first end 1250a with the remainder of the body 1250c of the bellows enhances adhesion of moisture to the bellows interior surfaces. In particular embodiments, the transition section 1250t and portions of the bellows connected to the transition section may be structured so that the transition section maintains its orientation with respect to the bellows central axis X3 during both stretching and contraction of the bellows, as the slide 204 extends and retracts during operation of the actuator 122.

As seen in FIG. 3A, the bellows transition section may be formed by a frustoconical wall portion extending from the bellows first end 1250a to the remainder of the bellows body 1250c. Frustoconical transition section 1250t may be structured to form a first angle θ with a central axis X3 of the bellows. A second, corrugated frustoconical section 1250s of the body 1250c connected to the transition section may be structured to form a second angle α with the central axis of the bellows. In one or more arrangements, the remainder of the body 1250c may be formed from conventional corrugated frustoconical sections such as second section 1250s. The first angle θ may be less than the second angle α. This arrangement gives the transition section 1250t a more vertical orientation when the actuator 122 and bellows 1250 are oriented as shown in FIG. 1B to support and operate the tailgate 118. In particular arrangements, the first angle θ may be in the range 15°-40° both when the bellows is fully contracted (i.e., when the tailgate is open) and when the bellows 1250 is fully extended (i.e., when the tailgate is closed).

In this arrangement, as seen in FIG. 3B, moisture M1 coming into contact with the transition section 1250t within the bellows interior 1250f may be more likely to flow downwardly along interior surfaces of the transition section, rather than becoming detached (due to the weight of the moisture) from a conventional bellows section oriented more horizontally. For example, moisture entering the bellows interior at or near the first end 1250a of the bellows may adhere to the transition section 1250t while moving in an arcuate or spiral path along the transition section surface toward the lowest point 1250w of the transition section 1250t when the actuator assembly is mounted in the vehicle. After the point 1250w is reached, the moisture may continue to flow along the bellows interior surfaces toward the bellows second end 1250b for drainage, without contacting the actuator components. The increased adhesion provided by the angled transition section 1250t may aid in keeping moisture in contact with the bellows interior surfaces as it migrates along the bellows interior toward the bellows second end 1250b for drainage. This keeps the moisture out of contact with the spring 218 and other components of the actuator 122.

Figure 4A:
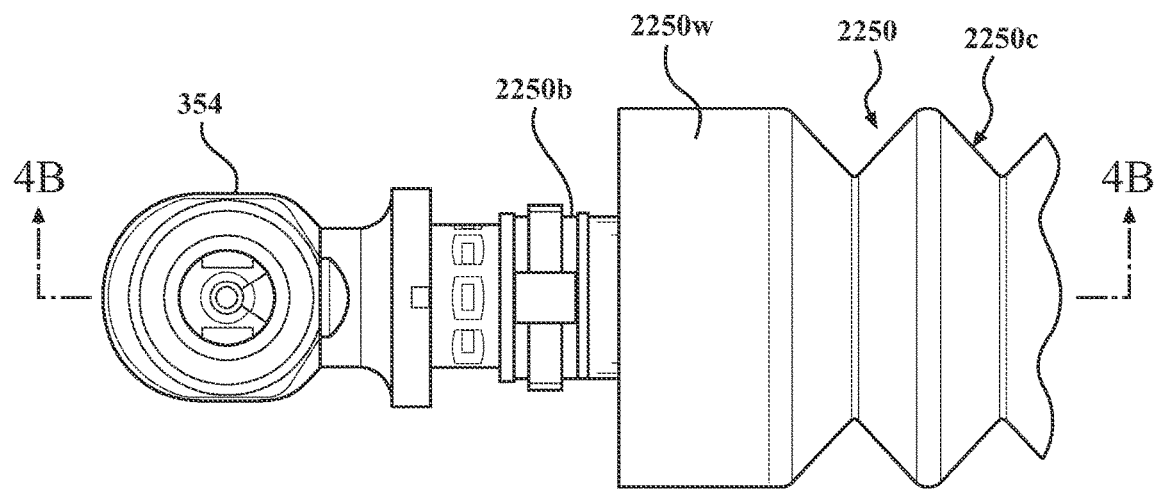
FIG. 4A is a schematic side view of a second end of another alternative embodiment of the bellows attached to an actuator.
Figure 4B:
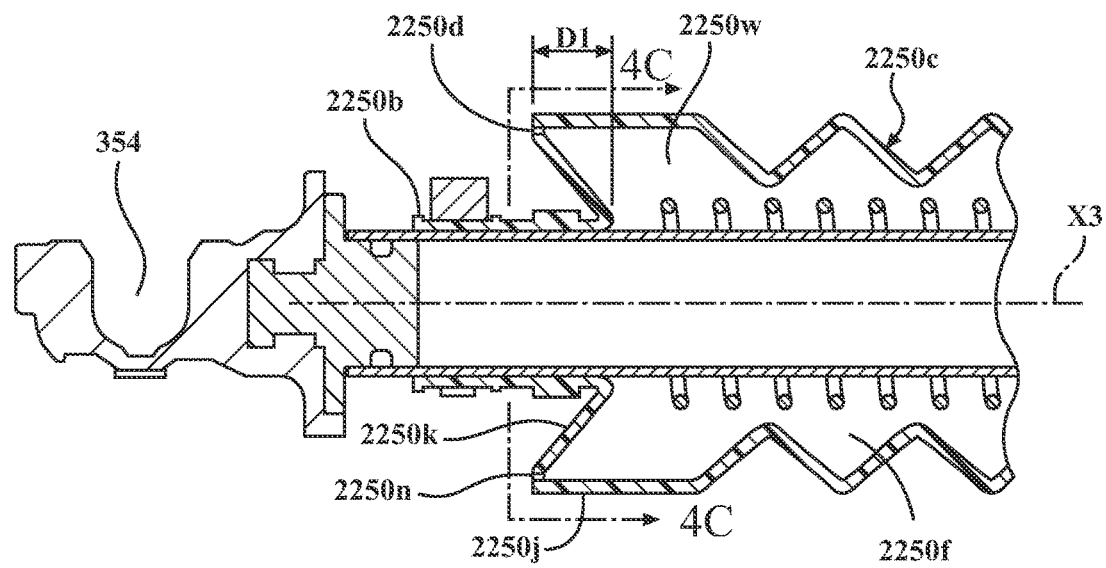
FIG. 4B is a schematic cross-sectional side view of the bellows end shown in FIG. 4A.
Figure 4C:
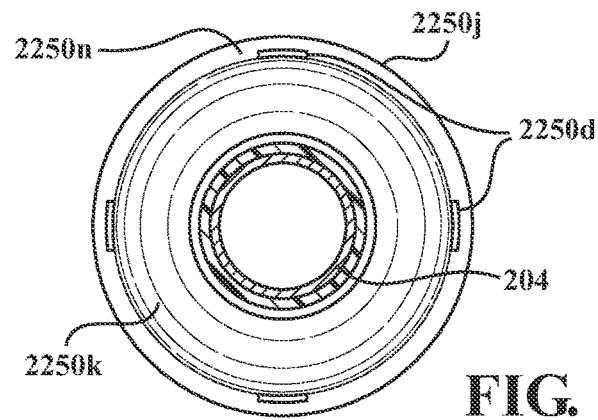
FIG. 4C is an end view of the bellows end shown in FIGS. 4A and 4B.

FIG. 4A is a schematic side view of a second end of 2250b another embodiment 2250 of the bellows attached to an actuator 122. FIG. 4B is a schematic cross-sectional side view of the bellows end shown in FIG. 4A. FIG. 4C is an end view of the bellows end 2250b shown in FIGS. 4A and 4B.

FIGS. 4A-4C show an embodiment where a drainage well 2250w is incorporated into the bellows proximate the bellows second end 2250b. The well 2250w may be positioned radially exterior of the bellows second end 2250b. The well 2250w may include one or more drainage holes 2250d formed along the well. In one or more arrangements, the well 2250w may have a first wall 2250j extending from a portion of the bellows body 2250c. In particular arrangements, first wall 2250j may be cylindrical. In other particular arrangements, first wall 2250j may be frustoconical. In addition, a second, frustoconical wall 2250k may extend from the bellows second end 2250b.

In one or more arrangements, one or more drainage hole(s) 2250d may be formed at an intersection between the first wall 2250j and the second wall 2250k. In particular arrangements, as seen in FIGS. 4A-4C, a short annular connecting portion 2250n may extend between adjacent ends of the first and second walls 2250*j*, 2250*k* to connect the walls, and the one or more drainage hole(s) 2250*d* may be formed along the connecting portion 2250*n*. As shown in the drawings, the well 2250*w* may extend 360° around the exterior of the slide second end 204*b*. Alternatively, the well may extend along only a limited arc length of the exterior of the slide second end.

In operation, embodiments of the well act to collect moisture flowing downwardly inside the bellows interior, especially moisture flowing along the bellows interior surfaces. The moisture may flow from the interior surfaces directly into the well 2250*w* to pool in the well. The well is structurally spaced apart or isolated from the actuator slide 204 and spring 218 so as to keep the moisture contained in the well and spaced apart from the actuator components until it can be drained through the hole(s) 2250*d*. Embodiments of the well can have any desired depth D1 consistent with bellows and actuator space envelope limitations, bellows tooling requirements, and other pertinent factors.

During operation of the actuator, as the bellows 2250 is contracted, air inside the bellows interior 2250*f* may become compressed, which tends to force liquid moisture residing in the well 2250*w* close to the hole(s) 2250*d* through the hole(s) to the bellows exterior.

Figure 5A:
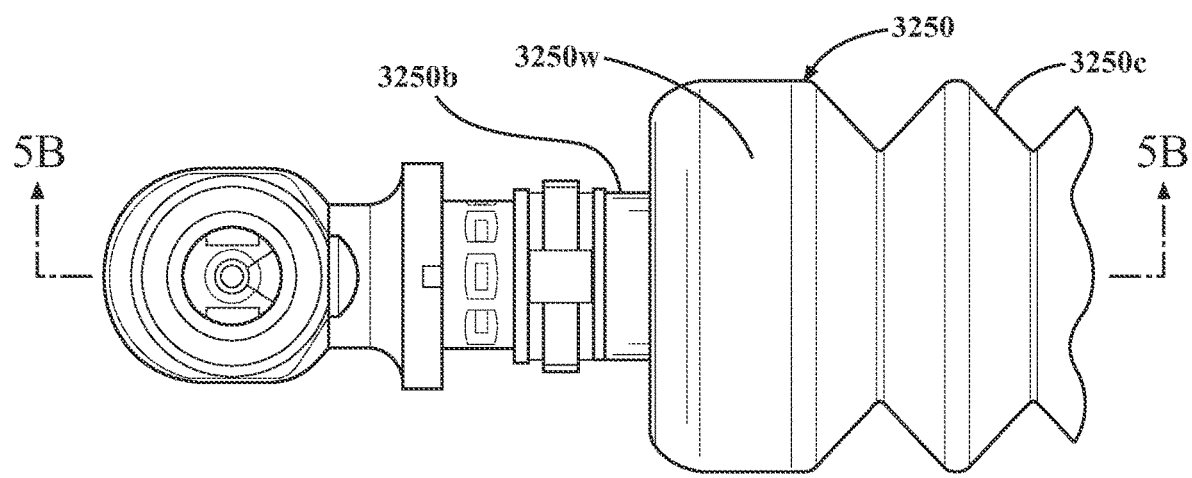
FIG. 5A is a schematic side view of a second end of yet another alternative embodiment of the bellows attached to an actuator.
Figure 5B:
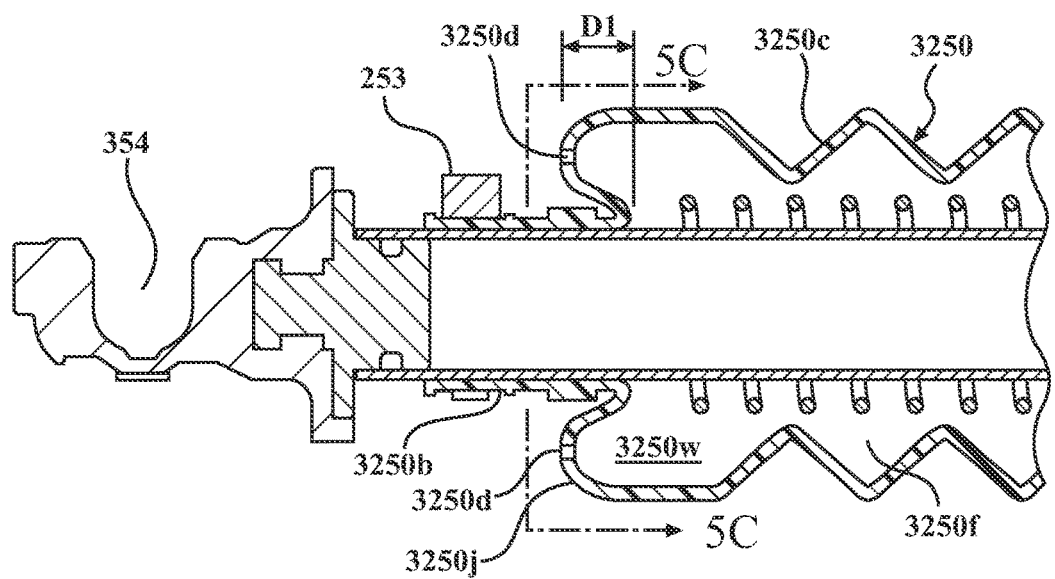
FIG. 5B is a schematic cross-sectional side view of the bellows end shown in FIG. 5A.
Figure 5C:
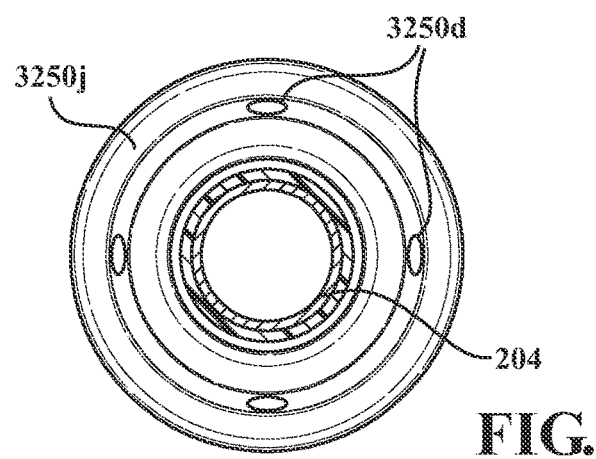
FIG. 5C is an end view of the bellows end shown in FIGS. 5A and 5B.

FIG. 5A is a schematic side view of a second end 3250*b* of yet another embodiment 3250 of the bellows attached to an actuator 122. FIG. 5B is a schematic cross-sectional side view of the bellows end shown in FIG. 5A. FIG. 5C is an end view of the bellows end shown in FIGS. 5A and 5B.

FIGS. 5A-5C show another embodiment where a drainage well 3250*w* is incorporated into the bellows 3250 proximate the bellows second end 3250*b*. The well 3250*w* may be positioned radially exterior of the bellows second end 3250*b*. The well 3250*w* may include one or more drainage holes 3250*d* formed along the well. In one or more arrangements, the well may be formed by a semi-torroidal wall 3250*j* extending from a portion of the bellows body 3250*c* and connecting to the second end 3250*b* of the bellows. As shown in the drawings, the well 3250*w* may extend 360° around the exterior of the slide second end 204*b*. Alternatively, the well may extend along only a limited arc length of the exterior of the slide second end.

In operation, embodiments of the well act to collect moisture flowing downwardly inside the bellows interior, especially moisture flowing along the bellows interior surfaces. The moisture may flow from the interior surfaces directly into the well 3250*w* to pool in the well. The well is structurally spaced apart or isolated from the actuator slide 204 and spring 218 so as to keep the moisture contained in the well and spaced apart from the actuator components until it can be drained through the hole(s) 3250*d*. Embodiments of the well 3250*w* can have any desired depth D1 consistent with bellows and actuator space envelope limitations, bellows tooling requirements, and other pertinent factors. During operation of the actuator, as the bellows 3250 is contracted, air inside the bellows interior 3250*f* may become compressed, which tends to force liquid moisture residing in the well close to the hole(s) 3250*d* through the hole(s) to the bellows exterior.

In addition to the shapes just described, a well incorporated into the bellows may have any of a variety of alternative shapes suitable for collecting moisture as described herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An actuator assembly comprising:
an actuator having a housing, a guide with a first end extending from the housing and a second end opposite the first end, and a slide coupled to the guide so as to be movable with respect to the guide second end; and
a bellows having a first end attached to the guide first end, a second end opposite the first end and attached to an end of the slide, and a body extending between the first and second bellows ends, at least one hole being formed in the bellows proximate the bellows second end and enabling fluid communication between an interior of the bellows and an exterior of the bellows, wherein an end of the slide is coaxially received in the guide second end along an overlap portion extending therebetween, wherein the slide is structured to be extendible from and retractable into the guide, and wherein the bellows is structured to enclose the overlap portion.

2. The assembly of claim 1 wherein the bellows first end has a first internal diameter and the bellows second end has a second internal diameter different from the first internal diameter.

3. The assembly of claim 2 wherein the second internal diameter is less than the first internal diameter.

4. The assembly of claim 1 wherein the bellows includes a first end attached to the guide adjacent the housing, and a second end opposite the first end, the second end being attached to an end of the slide.

5. The assembly of claim 1 further comprising a spring wrapped around at least a portion of the guide and at least a portion of the slide, and wherein the bellows is structured to enclose the spring.

6. The assembly of claim 1 wherein the bellows includes a frustoconical transition section connected to the bellows first end and structured to form a first angle with a central axis of the bellows, wherein the bellows body has a second frustoconical section connected to the transition section and structured to form a second angle with the central axis of the bellows, and wherein the first angle is less than the second angle.

7. The assembly of claim 1 wherein the bellows includes a well formed radially exterior of the bellows second end, and wherein the at least one hole is formed along the well.

8. The assembly of claim 7 wherein the well includes a first wall extending from a portion of the bellows body and a second, frustoconical wall extending from the bellows second end, and
wherein the at least one hole is formed at an intersection between the first wall and the second wall.

9. The assembly of claim 7 wherein the well comprises a semi-torroidal wall extending between a portion of the bellows and a second end of the bellows.

10. A bellows structured to cover at least a portion of a motor-driven spindle drive, the bellows comprising:
    a first end;
    a second end opposite the first end;
    a body extending between the first and second ends; and
    at least one hole formed proximate the bellows second end and enabling fluid communication between an interior of the bellows and an exterior of the bellows, wherein the bellows includes a frustoconical transition section connected to the bellows first end and structured to form a first angle with a central axis of the bellows, wherein the bellows body has a second frustoconical section connected to the transition section and structured to form a second angle with the central axis of the bellows, and wherein the first angle is less than the second angle.

11. The bellows of claim 10 wherein the bellows first end has a first internal diameter and the bellows second end has a second internal diameter different from the first internal diameter.

12. The bellows of claim 11 wherein the second internal diameter is less than the first internal diameter.

13. The bellows of claim 10 wherein the first angle is within a range of 15°-40° both when the bellows is fully contracted and when the bellows is fully extended.

14. A bellows structured to cover at least a portion of a motor-driven spindle drive, the bellows comprising:
    a first end;
    a second end opposite the first end;
    a body extending between the first and second ends; and
    at least one hole formed proximate the bellows second end and enabling fluid communication between an interior of the bellows and an exterior of the bellows,
    wherein the bellows includes a well formed radially exterior of the bellows second end, and wherein the at least one hole is formed along the well,
wherein the well includes a first wall extending from a portion of the bellows body and a second, frustoconical wall extending from the bellows second end, and
    wherein the at least one hole is formed at an intersection between the first wall and the second wall.

15. The bellows of claim 14 wherein first wall is cylindrical.

16. The bellows of claim 14 wherein the first wall is frustoconical.

17. The bellows of claim 14 wherein the well comprises a semi-torroidal wall extending between a portion of the bellows and a second end of the bellows.

* * * * *